US008790049B2

(12) United States Patent
Chen

(10) Patent No.: US 8,790,049 B2
(45) Date of Patent: Jul. 29, 2014

(54) INDEXABLE DOUBLE-NEGATIVE CUTTING INSERT HAVING PROTRUDING SIDE ABUTMENT SURFACES AND CUTTING TOOL

(75) Inventor: Danny Chen, Nahariya (IL)

(73) Assignee: Iscar, Ltd., Tefen (IL)

( * ) Notice: Subject to any disclaimer, the term of this patent is extended or adjusted under 35 U.S.C. 154(b) by 381 days.

(21) Appl. No.: 13/367,983

(22) Filed: Feb. 7, 2012

(65) Prior Publication Data

US 2013/0202371 A1 Aug. 8, 2013

(51) Int. Cl.
*B23B 27/16* (2006.01)

(52) U.S. Cl.
CPC ..................................... *B23B 27/16* (2013.01)
USPC ............................ 407/113; 407/103; 407/104

(58) Field of Classification Search
CPC .. B23B 27/16; B23B 27/005; B23B 27/1611; B23B 27/1614; B23B 27/1622; B23B 27/1651; B23B 27/1662; B23B 2200/12; B23B 2200/121; B23B 2200/161
USPC .......................................... 407/113, 103–105
See application file for complete search history.

(56) References Cited

U.S. PATENT DOCUMENTS

| 3,694,876 | A | * | 10/1972 | Erkfritz | ............................ | 407/48 |
| 3,762,005 | A | | 10/1973 | Erkfritz | | |
| 4,425,063 | A | * | 1/1984 | Striegl | ............................ | 408/81 |
| 4,682,916 | A | | 7/1987 | Briese | | |
| 5,639,189 | A | * | 6/1997 | Hoefler | ......................... | 407/113 |
| 5,702,210 | A | | 12/1997 | Boianjiu | | |
| 6,227,772 | B1 | * | 5/2001 | Heinloth et al. | ............... | 407/113 |
| 7,419,338 | B2 | * | 9/2008 | Smilovici et al. | ............. | 407/113 |
| 2004/0265073 | A1 | | 12/2004 | Hoefler et al. | | |
| 2006/0056925 | A1 | | 3/2006 | Hecht et al. | | |
| 2007/0003384 | A1 | | 1/2007 | Smilovici et al. | | |
| 2009/0162155 | A1 | * | 6/2009 | Wermeister | .................... | 407/114 |

(Continued)

FOREIGN PATENT DOCUMENTS

| JP | 11019817 A | * | 1/1999 | ................ | B23C 5/12 |
| JP | 11197910 A | * | 7/1999 | .............. | B23B 27/16 |

(Continued)

OTHER PUBLICATIONS

Search Report dated May 24, 2013 issued in PCT counterpart application (No. PCT/IL2013/050032).

*Primary Examiner* — Andrea Wellington
*Assistant Examiner* — Ryan Rufo
(74) *Attorney, Agent, or Firm* — Womble Carlyle Sandridge & Rice, LLP

(57) ABSTRACT

An indexable double-negative cutting insert includes an index axis A, two opposing end surfaces, a peripheral side surface which extends therebetween, and opposing side cutting edges formed between the end surfaces and the peripheral side surface. A median plane P is located midway between the end surfaces, passes through the peripheral side surface and is perpendicular to the index axis. The peripheral side surface includes at least one protrusion which extends in an outward direction relative to the index axis, in a plan view of either end surface. The protrusion includes two side abutment surfaces which converge in the outward direction towards the median plane P. In each cross-section perpendicular to the median plane, which cross-section passes through both opposing side cutting edges and also the at least one protrusion, no portion of the peripheral surface is inward of an imaginary line connecting the opposing side cutting edges.

29 Claims, 3 Drawing Sheets

(56) References Cited

U.S. PATENT DOCUMENTS

| | | |
|---|---|---|
| 2010/0266354 A1 | 10/2010 | Zitzlaff et al. |
| 2010/0310329 A1 | 12/2010 | Harif |
| 2012/0107061 A1 | 5/2012 | Harif |
| 2013/0051941 A1 | 2/2013 | Ben Amor et al. |

FOREIGN PATENT DOCUMENTS

| | | | | |
|---|---|---|---|---|
| JP | 2001-157904 A | * | 6/2001 | B23B 27/16 |
| JP | 2004-202687 A | * | 7/2004 | B23C 5/20 |
| JP | 2008-018515 A | * | 1/2008 | B23C 5/20 |
| JP | 2010-228052 A | * | 10/2010 | B23C 5/20 |

* cited by examiner

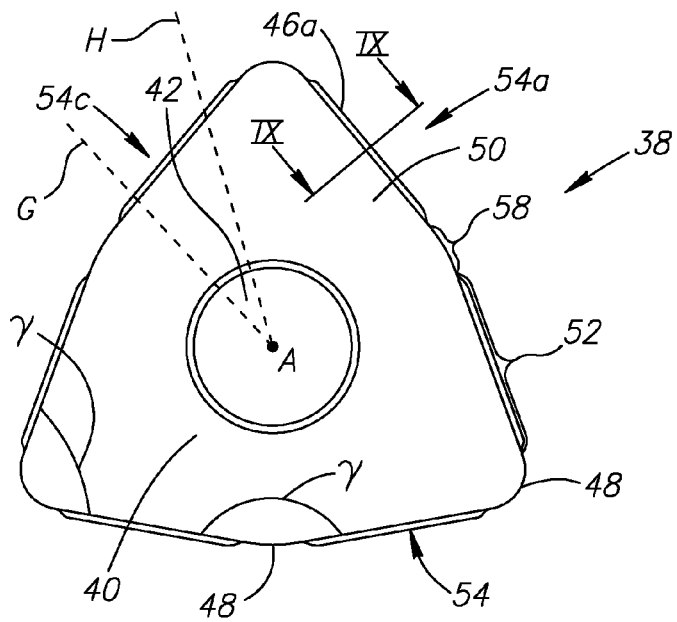
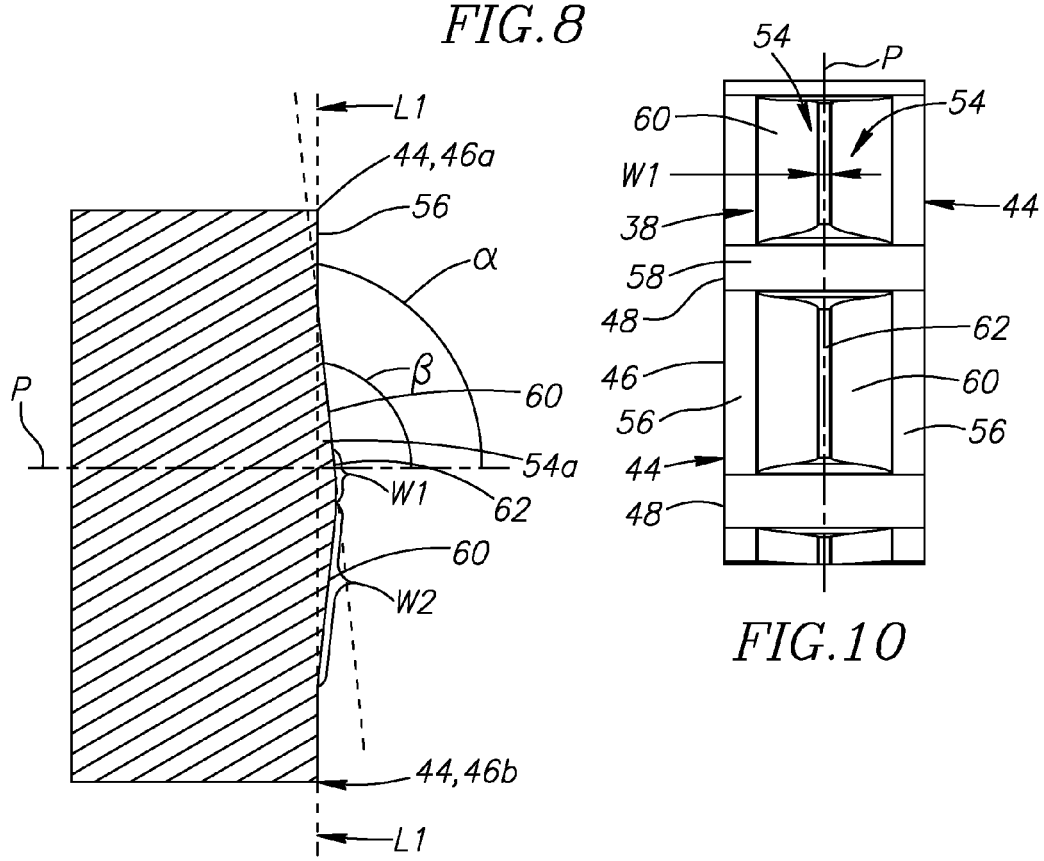
FIG.8
FIG.9
FIG.10

INDEXABLE DOUBLE-NEGATIVE CUTTING INSERT HAVING PROTRUDING SIDE ABUTMENT SURFACES AND CUTTING TOOL

FIELD OF THE INVENTION

The subject matter of the present application relates to cutting tools with indexable double-negative cutting inserts releasably secured thereon.

BACKGROUND OF THE INVENTION

A cutting tool with an indexable double-negative cutting insert is disclosed, for example, in U.S. Pat. No. 5,702,210. The disclosed cutting insert has flat side surfaces which fully extend between cutting edges on opposite end surfaces and serve as abutment surfaces.

SUMMARY OF THE INVENTION

The subject matter of the present application relates to cutting inserts which are known, according to ISO standards, as N-type, with regards to normal clearance. The cutting insert includes two end surfaces and a peripheral surface therebetween, which is generally perpendicular to the end surfaces and includes at least a protrusion with two outwardly converging side abutment surfaces. A possible advantage of such a cutting insert is that the abutment arrangement of the cutting insert in pocket is upgraded by the protrusion, while the orientation is kept the same, in comparison to other conventional N-type cutting inserts, which do not include the protrusion.

In accordance with the subject matter of the present application there is provided an indexable double-negative cutting insert having an index axis A around which the cutting insert is indexable, comprising:

two opposing end surfaces, each comprising at least one first functional surface, a peripheral surface extending between the end surfaces, and comprising at least one convex protrusion and at least two second functional surfaces, each extending at least between an adjacent cutting edge and the at least one protrusion;

a median plane P located midway between the end surfaces and passing through the peripheral surface, and at least two opposing side cutting edges, each formed at a junction between the peripheral surface and each of the opposing end surfaces;

wherein the at least one protrusion comprises two side abutment surfaces which converge outwardly towards the median plane P, in a plan view of each end surface, the protrusion extends outwardly from the cutting insert, and in each cross-section perpendicular to the median plane P, which cross-section passes through both opposing side cutting edges and also through the at least one protrusion, no portion of the peripheral surface is inward of an imaginary line L1 connecting the opposing side cutting edges.

In accordance with the subject matter of the present application there is further provided a cutting tool which includes a tool body and the cutting insert.

It is understood that the above-said is a summary, and that any of the aspects above can further comprise, or be further defined with, any of the features described in connection with any of the other aspects or described hereinbelow. For example, the following features may be applicable to any of the above aspects of the subject matter of the application:

The peripheral surface can include a plurality of peripheral side sections.

All the peripheral side sections can be identical.

The peripheral surface can include corner peripheral sections, which extend between each two adjacent peripheral side sections.

Each peripheral side section can include a least a portion of the protrusion and two second functional surfaces.

The peripheral side section can be the only portion of the cutting insert which includes the protrusion.

In a cross section of the at least one protrusion, taken perpendicular to the plane P and the peripheral surface, each side abutment surface can form an obtuse external angle β with the plane P.

The external angle β can be between 92° and 135°.

The external angle β can be between 94° and 101°.

The at least one protrusion can be elongated, and it can extend along the peripheral surface in a direction parallel to the plane P.

The side abutment surfaces can be elongated in a direction parallel to the plane P.

The cutting insert can have a plurality of protrusions which can be evenly distributed with respect to the index axis A.

Each two side abutment surfaces which are located on either side of the plane P, can meet at a protrusion top end.

On the at least one protrusion, only the side abutment surfaces are configured for abutment.

In a plan view of the cutting insert, a top end width W1 is shorter than half the length of a side abutment surface width W2.

In a plan view of each end surface, the majority of, or the entirety of, the at least one protrusion can be located further outwardly than any other portion of the peripheral surface.

The first functional surface can be configured as a rake surface and the second functional surface can be configured as a relief surface.

The cutting insert can be mirror symmetric with respect to the plane P.

The at least one protrusion can be mirror symmetric with respect to the plane P.

The cutting insert comprises corner cutting edges which can extend between adjacent cutting edges located on the same side of the plane P.

Each end surface has a rake surface associated with a corresponding one of the opposing side cutting edges; the peripheral surface is provided with a relief surface between the at least one protrusion and each of the opposing side cutting edges; and in each cross-section perpendicular to the plane P, which cross-section passes through both opposing side cutting edges and also the at least one protrusion, no portion of the relief surface is recessed with respect the imaginary line L1.

The second functional surfaces can be the only surfaces which extend between respective cutting edges and the at least one protrusion.

The second functional surfaces can be perpendicular to the plane P.

Each end surface can include at least one end abutment surface.

The sum length of the protrusions can be at least half of the total length of the peripheral surface.

The tool body can include a pocket which comprises:
an insert seating surface,
insert support surfaces forming an acute angle with the
  seating surface, and a clamping member for clamping the cutting insert in the pocket.

The clamping member can be a lever.

In an assembled position, a first end surfaces can abut the insert seating surface of the insert pocket, a plurality of side abutment surfaces which are adjacent a second end surface abut respective insert support surfaces, and the clamping member forces the cutting insert towards the insert support surfaces.

BRIEF DESCRIPTION OF THE DRAWINGS

For a better understanding of the subject matter of the present application and to show how the same may be carried out in practice, reference will now be made to the accompanying drawings, in which:

FIG. 8 is a plan view of a cutting insert;

FIG. 9 is a cross sectional view taken along line IX-IX of FIG. 8; and

FIG. 10 is a side view of a cutting insert;

Figure 1:
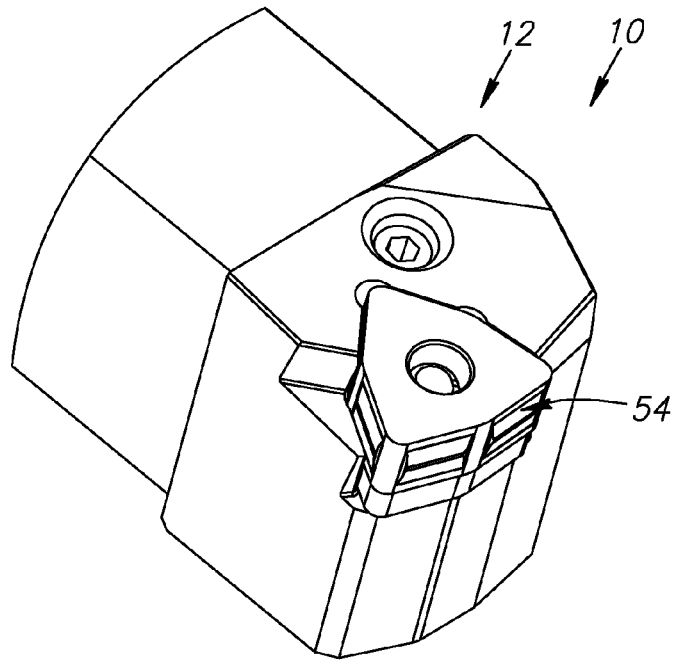
FIG. 1 is an isometric view of a cutting tool.

Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 2:
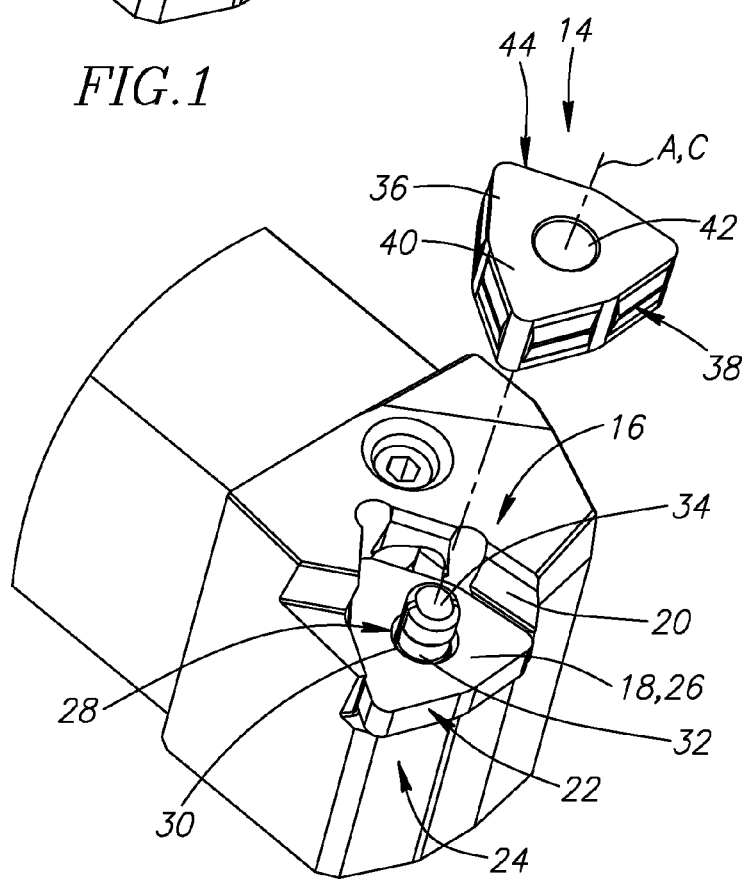
FIG. 2 is an isometric exploded view of the cutting tool of FIG. 1.

Reference is made to FIGS. 1 and 2. A cutting tool 10 includes a tool body 12 and an indexable double-negative cutting insert 14. The tool body 12 includes a pocket 16, in which the cutting insert 14 can be releasably and indexably secured.

Figure 5:
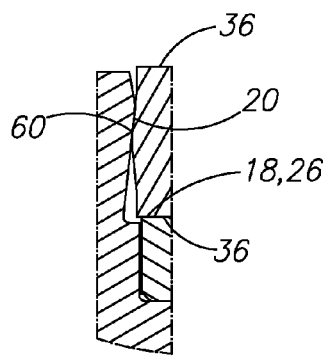
FIG. 5 is a cross sectional view taken along line V-V of FIG. 3.
Figure 6:
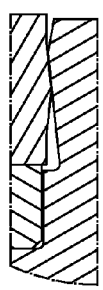
FIG. 6 is a cross sectional view taken along line VI-VI of FIG. 3.
Figure 7:
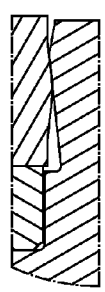
FIG. 7 is a cross sectional view taken along line VII-VII of FIG. 3.

The pocket 16 can include an insert seating surface 18 and, according to this example, three transverse insert support surfaces 20. As seen in FIG. 2 and FIGS. 4-7, the pocket 16 can include a shim 22, secured at a pocket bottom end 24. The insert seating surface 18 can be formed on, or be a part of, a shim top surface 26. The insert support surfaces 20 and the insert seating surface 18 can be generally continuous. As seen in FIGS. 5-7, the insert support surfaces 20 extend transversely with respect to the insert seating surface 18. All of the insert support surfaces 20 form an acute angle with the insert seating surface 18. The pocket 16 includes a clamping arrangement for clamping the cutting insert 14 and/or the shim 22. According to this example, the clamping arrangement can include a lever 28, which protrudes through an opening 30 in the insert seating surface 18. The lever 28 includes a lever body 32 and a lever head 34, which is used to clamp the cutting insert 14 in the pocket 16.

Reference is made to FIGS. 8-10. The cutting insert 14 includes two opposing end surfaces 36 and a peripheral surface 38 which extends therebetween. In a plan view of the cutting insert 14, each end surface 36 can have a polygonal shape. As seen in FIG. 8, according to this non-limiting example, the end surfaces 36 can be trigon shaped. Each end surface 36 can include at least one end abutment surface 40. The cutting insert 14 can have a clamping bore 42, which can open out to both end surfaces 36. The clamping bore 42 can have a cylindrical shape with a cylinder axis C. The cutting insert 14 has a median plane P, which is located midway between the end surfaces 36 and passes through the peripheral surface 38. The cutting insert 14 can be mirror symmetric with respect to the plane P.

The cutting insert 14 has an index axis A about which the insert is indexable. The index axis A is perpendicular to the plane P and passes through a geometrical center of each of the end surfaces 36. In the present example, the index axis A and the cylinder axis C are coaxial.

As seen in FIGS. 9 and 10, the cutting insert 14 can include two edges 44. Each edge 44 can be formed at a junction between the peripheral surface 38 and each of the end surfaces 36. The edges 44 can be continuous. According to the present example, with a trigon shape, each edge 44 can include six side cutting edges 46 and six corner cutting edges 48. On each end surface 36, depending on the machining application and orientation of the pocket 16, the cutting insert 14 can have three operative side cutting edges 46 and three operative corner cutting edges 48. Each corner cutting edge 48 can extend between two adjacent side cutting edges 46 located on the same side of the plane P.

According to the present example, each end surface 36 includes a plurality of first functional surfaces 50 which extend from the edge 44 towards the index axis A. Each first functional surface 50 can be associated with a side cutting edge 46, and configured to function as a rake surface.

The peripheral surface 38 can include a plurality of peripheral side sections 52. In this non-limiting example, the peripheral surface 38 includes identical six peripheral side sections 52. In a plan view of each end surface 36 (as seen FIG. 8), each peripheral side section 52 forms a corner angle γ with an adjacent peripheral side section 52. In the present example, the corner angle γ can be either acute or obtuse.

According to the present example, the peripheral surface 38 can include corner peripheral sections 58, which extend between each two adjacent peripheral side sections 52. Each corner peripheral section 58 can extend between opposing corner cutting edges 48 located on either side of the plane P. The corner peripheral sections 58 can have a curved shape. In a plan view of each end surface 36, the corner peripheral sections 58 can appear as a curved line. In other words, in the present example, the corner peripheral sections 58 are devoid of overhangs.

Each peripheral side section 52 can include a convex protrusion 54, which extends outwardly from the cutting insert 14, and two second functional surfaces 56 located on either side of the protrusion 54. Each second functional surface 56 extends between an adjacent edge 44 and the protrusion 54. On each peripheral side section 52, the second functional surfaces 56 can be located on either side of the plane P. According to this example, the second functional surface 56 is the only surface which is located between the edge 44 and the protrusion 54. Each second functional surface 56 can be associated with an adjacent first functional surface 50 and with a common side cutting edge 46. Each second functional surface 56 extends towards the plane P from the common side cutting edge 46. Each second functional surface 56 can be configured to function as a relief surface.

Each peripheral side section 52 is substantially perpendicular to the plane P. Specifically, the second functional surfaces 56 can form a right clearance angle $\alpha$ with the plane P. In other words, according to ISO standards governing designation of indexable cutting inserts, the cutting insert 14 can be classified as N-type, or receive, a designation letter symbol [N] for normal clearance. Cutting inserts classified as N-type are sometimes referred to as negative cutting inserts. The cutting insert 14 according to the subject matter of the present application is both double-sided and negative. It is therefore referred to herein as a "double-negative" cutting insert 14.

Figure 3:
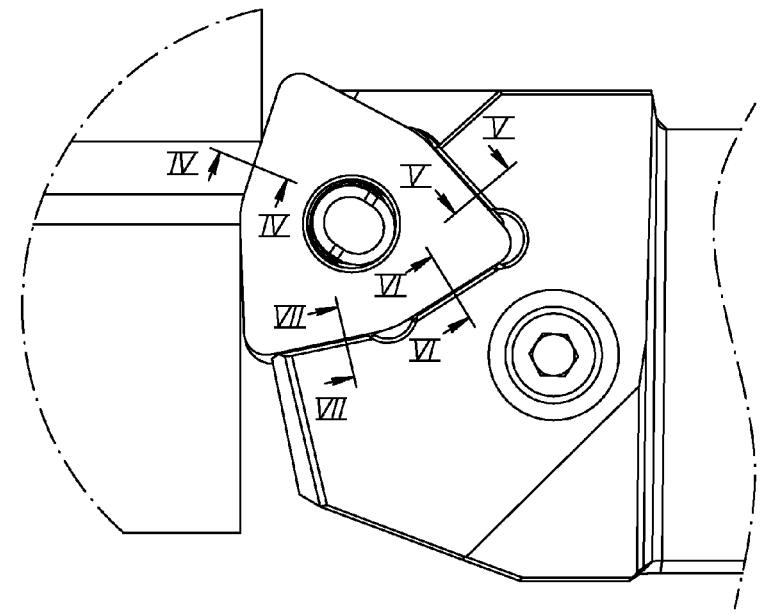
FIG. 3 is a plan view of the cutting tool of FIG. 1 performing a cutting operation on a workpiece.
Figure 4:
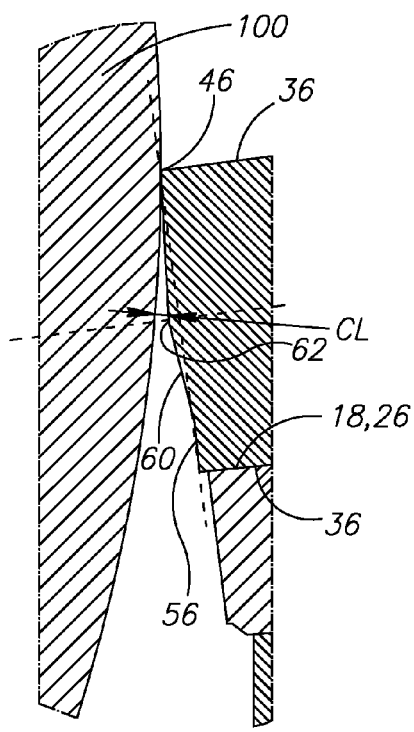
FIG. 4 is a cross sectional view taken along line IV-IV of FIG. 3.

In a plan view of each end surface 36 (FIGS. 3 and 8), the protrusion 54 can extend outwardly from the cutting insert 14 in a direction which is parallel to the plane P and generally perpendicular to the peripheral surface 38. According to the present example, in each of the peripheral side sections 52, the majority of the protrusion 54 is located further outwardly, in the direction parallel to the plane P, than any other portion of the peripheral surface 38. More specifically, in each of the peripheral side sections 52, the entire protrusion 54 is located further outwardly than any other portion of the peripheral surface 38.

As seen in FIGS. 8 and 9, in a cross-section perpendicular to the plane P, which cross-section passes through both opposing side cutting edges 46a, 46b and also through the at least one protrusion 54a, no portion of the peripheral surface 38 is inward of an imaginary line L1 connecting the opposing side cutting edges 46a, 46b. This also holds true for radial cross-sections, such as those taken along radial lines G and H which pass through the index axis A (see FIG. 8) and intersect the peripheral surface 38 at a peripheral side surface 52 where a protrusion 54c is present. In such case, the entire peripheral surface 38 along any such a radial cross-section is farther from the index axis A than the imaginary line L1 connecting the opposing side cutting edges 46a, 46b at that cross-section.

The protrusion 54 can be elongated. According to the example shown in the figures, the protrusion 54 can be elongated in a direction substantially parallel to the plane P. The protrusion 54 can be mirror symmetric with respect to the plane P. The protrusions 54 can be evenly distributed on the peripheral surface 38 with respect to the index axis A. The protrusions 54 can be evenly distributed among the peripheral side sections 52. In this example, only the peripheral side sections 52 include protrusions 54 and not the corner peripheral sections 58. In this example, the sum of lengths of the protrusions 54 can be at least half of the length of the peripheral surface 38. Each protrusion 54 can extend across more than half of the length of the respective peripheral side section 52.

Each protrusion 54 includes two side abutment surfaces 60 which are located on either side of the plane P. On each protrusion 54, only the side abutment surfaces 60 are configured for abutment, or contact with any surface of the pocket 16. As seen in a cross section of the protrusion 54 in FIG. 9, taken perpendicular to the plane P and to the peripheral surface 38, the side abutment surfaces 60, or respective planes tangent thereto, converge outwardly, in a direction parallel to the plane P. Stated differently, in a cross section of the protrusion 54, taken perpendicular to the plane P and to the peripheral surface 38, each side abutment surface 60, or a plane tangent thereto, forms an obtuse external angle $\beta$ with the plane P. The external angle $\beta$ can be between 92° and 105°. Preferably, the external angle $\beta$ can be between 94° to 101°.

When the cutting insert 14 is secured in the pocket 16, and the cutting tool 10 is operative, i.e., performs cutting operations on a workpiece, the abovementioned orientation of the side abutment surfaces 60 gives excellent results in terms of secure abutment. In a cross section (FIG. 4) taken perpendicularly to the peripheral surface 38 and to the plane P, the cutting tool 10 is shown while performing a cutting operation on a workpiece 100. A protrusion clearance CL can be defined as the shortest distance measured between the side abutment surface 60 adjacent the currently operative side cutting edge 46, and the portion of the workpiece which was machined by the same side cutting edge 46. It should be noted that in FIG. 4, the specific location chosen for the protrusion clearance is just for illustration purposes. In reality, this location may vary depending on several parameters. In general, the abovementioned protrusion design, and consequently the external angle $\beta$, are chosen such that a sufficient protrusion clearance CL is maintained between the side abutment surface 60 and the workpiece, in order to avoid contact between the cutting insert and the workpiece during cutting operations.

Attention is drawn to FIG. 9 which shows a cross-sectional view of the peripheral side surface 38 at a peripheral side section 52. Each protrusion 54 can include a protrusion top end 62, which can be the most outward portion of the protrusion 54. Each two side abutment surfaces 60, which are located on either side of the plane P, can connect with, or meet at, the protrusion top end 62. As shown in the cross section of the cutting insert 14 (FIG. 9), the protrusion top end 62 can appear as a line. A top end width W1 of the protrusion top end 62 is defined as the length of the line which extends between the two converging side abutment surfaces 60. In the cross section shown in FIG. 9, each side abutment surface 60 can also appear as a line. A side abutment width W2 of each of the side abutment surfaces 60 is defined as the length of the line which extends between the protrusion top end 62 and the respective second functional surface 56. The top end width W1 can be considerably narrow relative to the side abutment width W2. Specifically, the top end width W1 can be less than half the side abutment width W2. As a result, sufficient room on the protrusion 54 remains, such that the side abutment surfaces 60 can have a relatively wide design, in order to maximize the contact area in the pocket.

According to this example, each end surface 36 can include six first functional surfaces 50. In the present example, the first functional surfaces 50 can be configured to function as rake surfaces. In other words, adjacent the edge 44, each first functional surface 50 of one end surface 36 can extend generally inwards, partially towards the opposing end surface 36. Each first functional surface 50 extends from an associated side cutting edge 46 towards the index axis A. Each first functional surface 50 can be associated with a given adjacent peripheral side section 52.

In an assembled position of the cutting tool 10, the cutting insert 14 is securely clamped in the pocket 16. The lever head 34 abuts a portion of the clamping bore 42 and presses the cutting insert 14 towards the insert support surfaces 20 of the pocket 16. One of the end surfaces 36 abuts the insert seating surface 18 of the pocket 16, and will be referred to herein as a non-operative end surface 36. Specifically, the end abutment surface 40 abuts the insert seating surface 18. The other end surface 36 will be referred to herein as an operative end surface 36. In this example, three of the side abutment surfaces 60 which are adjacent the operative end surface 36 abut respective insert support surfaces 20.

As previously disclosed, the cutting tool 10 of the present example can have six corner cutting edges 48, however, with a trigon shape, depending on the application and orientation of the pocket 16, only three, non-consecutive corner cutting edges 48 are configured as operative corner cutting edges 48. In the present example, the corner cutting edges 48 associated with the obtuse corner angle γ are operative corner cutting edges 48.

A possible advantage of the protrusion 54 and the specific orientation of the insert support surfaces 20 as described above, is that the double-negative nature (or known advantages and features thereof) of the cutting insert 14 is preserved, while at the same time, a more efficient form of abutment is achieved. In other words, the cutting insert 14 can still be secured with the same orientation with respect to the workpiece as, e.g., other N-type cutting inserts 14, which do not include the protrusion 54 or the side abutment surfaces 60, as disclosed by the present application. The possibility of keeping the same orientation conditions while improving the abutment arrangement shortens the time it takes to design the tool body 12 and pocket 16 which, in turn, lowers development costs.

Another possible advantage of the protrusion 54 is that, in comparison with other double-negative inserts, the protrusion 54 adds to the total structure toughness of the cutting insert 14. Specifically, the area of the peripheral surface adjacent the side cutting edge 46, and consequently the side cutting edge 46 itself, become more resistant to breakage, in comparison to other cutting insert 14 which lack a protrusion, or have recesses in the peripheral surface 38.

Yet another possible advantage of the protrusion 54 is that it enables secure clamping of the cutting insert 14 in the pocket 16, without the need for a top clamp in the pocket 16, which can obstruct chip flow and raise production costs. Clamping of the cutting insert 14 without an upper clamp is achieved by forcing (via, e.g., a lever arrangement) the cutting insert 14 against the insert support surfaces 20 in the pocket 16 which, in turn, generates normal reaction forces directed partially downwards, towards the insert seating surface 18.

The description above includes exemplary embodiments and details for enablement, if needed, of claimed subject matter, and does not exclude non-exemplified embodiments and details from the claim scope of the present application.

What is claimed is:

1. An indexable double-negative cutting insert (14) having an index axis (A) about which the insert is indexable, comprising:
   two opposing end surfaces (36), each comprising at least one first functional surface (50);
   a peripheral surface (38) extending between the end surfaces (36) and comprising at least one convex protrusion (54) and at least two second functional surfaces (56), each extending at least between an adjacent end surface (36) and the at least one protrusion (54);
   a median plane (P) located midway between the end surfaces (36) and passing through the peripheral surface (38); and
   at least two opposing side cutting edges (46), each formed at a junction between the peripheral surface (38) and each of the opposing end surfaces (36);
   wherein
   the at least one protrusion (54) comprises two side abutment surfaces (60) which converge outwardly towards the median plane (P);
   on the at least one protrusion (54), only the side abutment surfaces (60) are configured as abutment surfaces;
   in a plan view of each end surface (36), the protrusion (54) extends outwardly from the cutting insert (14); and
   in each cross-section perpendicular to the median plane (P), which cross-section passes through both opposing side cutting edges (46) and also through the at least one protrusion (54), no portion of the peripheral surface (38) is inward of an imaginary line (L1) connecting the opposing side cutting edges (46).

2. The cutting insert (14) according to claim 1, wherein the peripheral surface (38) comprises a plurality of peripheral side sections (52).

3. The cutting insert (14) according to claim 2, wherein all the peripheral side sections (52) are identical.

4. The cutting insert (14) according to claim 2, wherein the peripheral surface (38) comprises corner peripheral sections (58), which extend between each two adjacent peripheral side sections (52), each corner peripheral section (58) extending between opposing corner cutting edges (48) and having a curved shape devoid of overhangs.

5. The cutting insert (14) according to claim 2, wherein each peripheral side section (52) comprises at least a portion of the at least one protrusion (54) and two second functional surfaces (56).

6. The cutting insert (14) according to claim 2, wherein only the peripheral side sections (52) comprise the at least one protrusion (54).

7. The cutting insert (14) according to claim 1, wherein in a cross section of the at least one protrusion (54), taken perpendicular to the plane (P) and to the peripheral surface (38), each side abutment surface (60) forms an obtuse external angle β with the plane (P).

8. The cutting insert (14) according to claim 7, wherein the external angle β is between 92° and 135°.

9. The cutting insert (14) according to claim 7, wherein the external angle β is between 94° and 101°.

10. The cutting insert (14) according to claim 1, wherein the at least one protrusion (54) is elongated, and extends along the peripheral surface (38) in a direction parallel to the plane (P).

11. The cutting insert (14) according to claim 1, wherein the side abutment surfaces (60) are elongated in a direction parallel to the plane (P).

12. The cutting insert (14) according to claim 1, wherein
   the peripheral side surface (38) comprises a plurality of protrusions (54); and
   the plurality of protrusions (54) are evenly distributed with respect to the index axis (A).

13. The cutting insert (14) according to claim 1, wherein each two side abutment surfaces (60) which are located on either side of the plane (P), meet at a protrusion top end (62).

14. The cutting insert (14) according to claim 1, wherein in a plan view of the cutting insert (14), a top end width (W1) is shorter than half the length of a side abutment width (W2).

15. The cutting insert (14) according to claim 1, wherein, in each cross-section perpendicular to the plane (P), which cross-section passes through both opposing side cutting edges (46) and also through the at least one protrusion (54), the at least one protrusion (54) is located further outwardly than any other portion of the peripheral surface (38).

16. The cutting insert (14) according to claim 1, wherein the first functional surface (50) is configured to be a rake surface and the second functional surface (56) is configured to be a relief surface.

17. The cutting insert (14) according to claim 1, wherein the cutting insert (14) is minor symmetric with respect to the plane (P).

18. The cutting insert (14) according to claim 1, wherein the at least one protrusion (54) is mirror symmetric with respect to the plane (P).

19. The cutting insert (14) according to claim 1, wherein the cutting insert (14) comprises corner cutting edges (48)

which extend between adjacent side cutting edges (46) located on the same side of the plane (P).

20. The cutting insert (14) according to claim 1, wherein
each end surface (36) comprises a rake surface (50) associated with a corresponding one of the opposing side cutting edges (46);
the peripheral surface (38) is provided with a relief surface (56) between the at least one protrusion (54) and each of the opposing side cutting edges (46); and
in said each cross-section perpendicular to the plane (P), which cross-section passes through both opposing side cutting edges (46) and also the at least one protrusion (54), no portion of the relief surface (56) is recessed with respect the imaginary line (L1).

21. The cutting insert (14) according to claim 1, wherein only the second functional surfaces (56) extend between respective side cutting edges (46) and the at least one protrusion (54).

22. The cutting insert (14) according to claim 1, wherein the second functional surfaces (56) are perpendicular to the plane P.

23. The cutting insert (14) according to claim 1, wherein each end surface (36) comprises at least one end abutment surface (40) suitable for seating the cutting insert on an insert seating surface.

24. The cutting insert (14) according to claim 1, wherein
the peripheral side surface (38) comprises a plurality of protrusions (54); and
the sum length of the plurality of protrusions (54) is at least half of the total length of the peripheral surface (38).

25. A cutting tool (10) comprising a tool body (12) and the cutting insert (14) according to claim 1 secured in a pocket (16) of the tool body (12).

26. The cutting tool (10) according to claim 25, wherein the pocket (16) comprises:
an insert seating surface (18),
insert support surfaces (20) which form an acute angle with the seating surface, and
a clamping member for clamping the cutting insert (14) in the pocket (16).

27. The cutting tool (10) according to claim 26, wherein
at least a portion of a first end surface (36) abuts the insert seating surface (18),
a plurality of side abutment surfaces (60) which are adjacent a second end surface (36)
abut respective insert support surfaces (20), and
the clamping member forces the cutting insert (14) towards the insert support surfaces (20).

28. The cutting tool (10) according to claim 25, wherein the clamping member is a lever (28).

29. An indexable double-negative cutting insert (14) having an index axis (A) about which the insert is three-way indexable, comprising:
two opposing trigon-shaped end surfaces (36), each comprising at least one first functional surface (50);
a peripheral surface (38) extending between the end surfaces (36) and comprising at least one convex protrusion (54) and at least two second functional surfaces (56), each extending at least between an adjacent end surface (36) and the at least one protrusion (54);
a median plane (P) located midway between the end surfaces (36) and passing through the peripheral surface (38); and
at least two opposing side cutting edges (46), each formed at a junction between the peripheral surface (38) and each of the opposing end surfaces (36);
wherein
the at least one protrusion (54) comprises two side abutment surfaces (60) which converge outwardly towards the median plane (P);
in a plan view of each end surface (36), the protrusion (54) extends outwardly from the cutting insert (14); and
in each cross-section perpendicular to the median plane (P), which cross-section passes through both opposing side cutting edges (46) and also through the at least one protrusion (54), no portion of the peripheral surface (38) is inward of an imaginary line (L1) connecting the opposing side cutting edges (46).

\* \* \* \* \*